United States Patent

Ruebsam et al.

(10) Patent No.: US 8,019,519 B2
(45) Date of Patent: Sep. 13, 2011

(54) SHIFT CONTROL UNIT AND METHOD FOR CONTROLLING A SHIFT PROCEDURE IN A STEPPED TRANSMISSION

(75) Inventors: Christian Ruebsam, Ketten (DE); Jan Sporleder, Kaiserslautern (DE)

(73) Assignee: GM Global Technology Operations LLC, Detroit, MI (US)

( * ) Notice: Subject to any disclaimer, the term of this patent is extended or adjusted under 35 U.S.C. 154(b) by 450 days.

(21) Appl. No.: 12/330,422

(22) Filed: Dec. 8, 2008

(65) Prior Publication Data

US 2009/0199670 A1 Aug. 13, 2009

(30) Foreign Application Priority Data

Dec. 6, 2007 (DE) .................... 10 2007 058 797

(51) Int. Cl.
*F16H 61/28* (2006.01)
*G06F 19/00* (2006.01)

(52) U.S. Cl. ............ 701/64; 701/51; 701/66; 74/473.12

(58) Field of Classification Search .................... 701/64, 701/51, 66; 74/473.12, 473.18, 335
See application file for complete search history.

(56) References Cited

U.S. PATENT DOCUMENTS

| 6,012,352 A * | 1/2000 | Ishii et al. .................. 74/473.18 |
| 6,405,611 B1 * | 6/2002 | DeJonge et al. ................ 74/335 |
| 2004/0214688 A1 * | 10/2004 | Takasaki et al. .............. 477/115 |

FOREIGN PATENT DOCUMENTS

| DE | 10312400 A1 | 10/2003 |
| DE | 10304588 B3 | 4/2004 |
| DE | 102004017794 A1 | 10/2005 |
| EP | 1271010 A1 | 1/2003 |

* cited by examiner

*Primary Examiner* — Tan Q Nguyen
(74) *Attorney, Agent, or Firm* — Ingrassia Fisher & Lorenz, P.C.

(57) ABSTRACT

A shift-by-wire control unit is provided that includes, but is not limited to a sensor for detecting the position of a shift lever, which is movable on a path between a neutral position and at least one shift position, a control circuit, and an actuator for driving a selector fork in accordance with a movement of the shift lever detected by the control unit. The control circuit is set up to predefine a setpoint position of the actuator for each detected position of the shift lever, the rate of change of the setpoint position as a function of the shift lever position being higher in a first area of the path adjacent to the neutral position than in a second area of the path, which is at a greater distance from the neutral position than the first area.

14 Claims, 2 Drawing Sheets ably makes up a significant part of the total path to be covered from the neutral position into the shift position. This is correspondingly true for the paths over which the shift/selection lever must be displaced between its neutral position and the shift position or the synchronization position. The time required for the displacement between neutral position and synchronization position therefore makes up a significant component of the total duration of a shift procedure. This total duration may be decreased without loss of shift comfort if the time required for the displacement between neutral position and synchronization position is decreased in relation to the duration of the synchronization procedure itself.

SHIFT CONTROL UNIT AND METHOD FOR CONTROLLING A SHIFT PROCEDURE IN A STEPPED TRANSMISSION

CROSS-REFERENCE TO RELATED APPLICATION

This application claims priority to German Patent Application No. 102007058797.1, filed Dec. 6, 2007, which is incorporated herein by reference in its entirety.

TECHNICAL FIELD

The present invention relates to a shift control unit, also referred to as a shift-by-wire control unit, for controlling a shift procedure in a stepped transmission on the basis of an input of a user.

BACKGROUND

Control units of this type are increasingly replacing typical mechanical external shifters, which rigidly couple a shift/selection lever in the passenger compartment of a motor vehicle to a selector fork of a transmission, for example, via a linkage or a cable pull mechanism.

To allow secure shifting, the path to be covered by the selector fork between two shift positions may not be too small. Correspondingly, the path which the selector fork covers between a neutral position and a synchronization position generally makes up a significant part of the total path to be covered from the neutral position into the shift position. This is correspondingly true for the paths over which the shift/selection lever must be displaced between its neutral position and the shift position or the synchronization position. The time required for the displacement between neutral position and synchronization position therefore makes up a significant component of the total duration of a shift procedure. This total duration may be decreased without loss of shift comfort if the time required for the displacement between neutral position and synchronization position is decreased in relation to the duration of the synchronization procedure itself.

A typical shift-by-wire control unit, as is known, for example, from DE 103 04 588 B3, essentially only requires a user input of arbitrary form to control the changeover to a gear specified by the user input. The shift procedure then runs according to a predefined time program. The duration of the shift procedure is thus essentially fixed. The shorter this duration, the more rapidly the shifter reacts to the user input, but the more noisily and uncomfortably for the passengers the shift procedure runs. The possible desire of the driver for a faster or slower shift procedure may not be taken into consideration.

The object of the invention is to provide a shift-by-wire control unit which allows the performance of a shift procedure in a shorter time, which may be influenced by the driver, however.

SUMMARY

The object is achieved in that, in a shift-by-wire control unit having a sensor for detecting the position of a shift lever movable on a path between a neutral position and at least one shift position, a control circuit, and an actuator for driving a selector fork corresponding to a movement of the shift lever detected by the control unit, the control circuit predefines a setpoint position of the actuator for every detected position of the shift lever, the rate of change of the setpoint position as a function of the shift lever position being higher in a first area of the path adjacent to the neutral position than in a second area of the path, which is at a greater distance from the neutral position than the first area. On the one hand, this allows the driver, by moving the shift lever at varying velocity, to determine the rapidity of the shift procedure individually precisely as in a typical mechanical external gear selector in every individual case, but shortens the time which is required to move the selector fork from the neutral position via the first area of the path to a synchronization position, which may lie in the second area of the path, and thus makes accelerated shifting possible overall.

For the sake of simplicity, the rate of change is preferably constant and positive in the first area, while it may be zero in the second area.

The rate of change in the first area (18) may be permanently predefined for all shift procedures. According to an alteration, it may be established individually for every shift procedure, and it is expediently selected higher the greater a measured velocity of the movement of the shift lever (1). This means that when the driver moves the shift lever rapidly to perform a rapid shift procedure, the setpoint position of the actuator (or, in other words, the selector fork driven by the actuator) varies more strongly with the shift lever position the more rapidly the shift lever is moved. The velocity of the actuator thus increases more than linearly proportional to the shift lever velocity.

The setpoint position preferably lies in the second area between a synchronization position and a shift position of the actuator. As long as the synchronization is not completed, the actuator may not advance beyond the synchronization position in the direction of its shift position. The greater the discrepancy between the setpoint position and the synchronization position, the greater the positioning force exerted by the actuator in the transmission, and the more rapidly the synchronization is executed, which is a requirement for the advance of the actuator into its shift position.

If, in addition, the setpoint position of the actuator in the second area is also to be established as a function of the velocity of the shift lever, in the event of a rapid movement of the shift lever, this results in a further increase of the positioning force of the actuator and thus a further acceleration of the synchronization.

The path may also comprise a third area, which is closer to the shift position than the first and second areas, and in which the rate of change is again greater than zero. By moving the shift lever through this area, a clutch sleeve of a locking synchronizer assembly of the shift transmission may be displaced from a synchronization position into the shift position.

The rate of change of the setpoint position in the third area is preferably between the rate of change in the first area and that in the second area.

This third area preferably contains the shift position.

The neutral position may in turn be contained in a fourth area of the path in which the rate of change is less than in the first area. In particular, the rate of change may be zero at the neutral position, so that small shift movements which a driver performs on the shift lever in the neutral position do not result in an actuation of the actuator by the control unit.

The measurement of the shift lever velocity, which is required for a velocity-dependent selection of the slope of the first section and/or the length of the second section, may be performed while the shift lever is located in the fourth area.

A method for controlling a shift procedure in a stepped transmission having the following steps is a further object of the invention:

a. detecting the position of a shift lever movable on a path between a neutral position and at least one shift position;
b. establishing a setpoint position of an actuator on the basis of a function which specifies the setpoint position as a function of the detected shift lever position; activating the actuator to implement the setpoint position;
a. the rate of change of the function having the shift lever position being higher in a first area of the path, adjacent to the neutral position, than in the second area of the path, which is at a greater distance from the neutral position than the second area.

A computer program having program code means to execute the steps of the method described, above all on a computer coupled to a sensor and an actuator, and thus to implement a control unit of the type described above, is a further object of the invention A data carrier on which such a computer program is recorded in machine-readable form is a further object of the invention.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
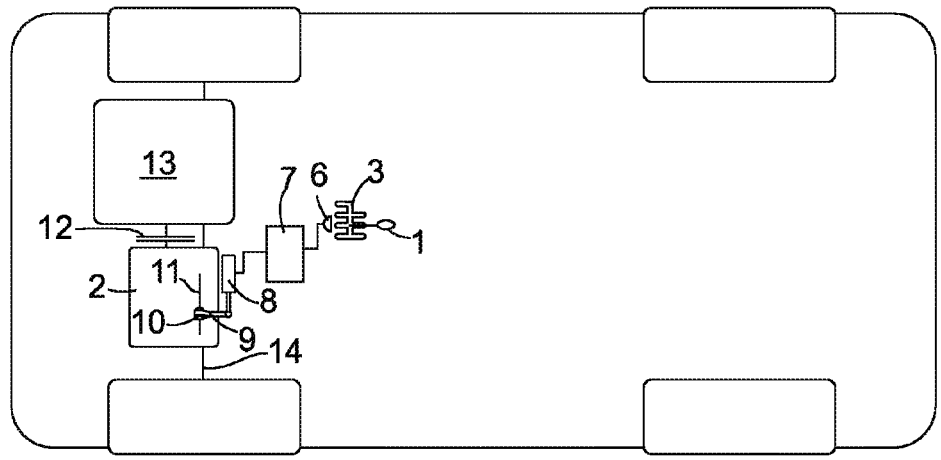
FIG. 1 shows a block diagram of a motor vehicle having a shift control unit according to an embodiment of the invention.

FIG. 1 is a very schematic block diagram of a motor vehicle, on which the present invention is implemented. A shift/selection lever 1 for selecting a gear to be engaged in a stepped transmission 2 is guided in a shift gate 3 in a passenger compartment of the vehicle. The shift gate 3 shown enlarged in FIG. 2 has a plurality of shift lanes 4, which are connected by a selection lane 5. A sensor 6 for detecting the position of the shift/selection lever in two degrees of freedom, along the selection lane 5 or one of the shift lanes 4, is situated on the shift/selection lever 1. The sensor 6 is connected to a microcontroller 7. The microcontroller 7 controls a plurality of actuators 8 of arbitrary construction, only one of which is shown as an example in FIG. 1 and which are each used for displacing a selector fork 9 in the interior of the stepped transmission 2. Each selector fork 9 encloses a clutch sleeve 10 of a locking synchronization assembly of the stepped transmission 2. The locking synchronization assembly is used in each case for selective coupling and decoupling of a gear wheel to and from a shaft, such as the shaft 11 of the stepped transmission 2.

Locking synchronization assemblies of this type are known to those skilled in the art and are therefore not separately shown in the figure and described.

Depending on the gear engaged in the stepped transmission, different ones of the locking synchronization assemblies are engaged with or disengaged from adjacent gear wheels.

A clutch 12, which is situated in a shaft extending from the engine 13 to the stepped transmission 2, may be actuated in a way known per se by a clutch pedal (not shown) or alternatively may be subject to control by the microcontroller 7.

Figure 2:
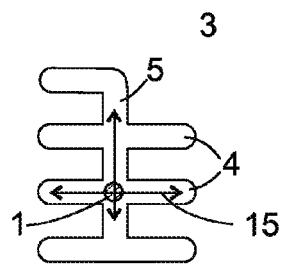
FIG. 2 shows a schematic illustration of the shift gate, which establishes the possible movements of a shift/selection lever used as the input means of the control unit.

In the illustration of FIGS. 1 and 2, the shift/selection lever 1 is located in the selection lane 5 of the shift gate 3. As long as this is the case, the stepped transmission 2 is in a neutral state; i.e., no torque is transmitted from the engine 13 to the output shaft 14. On the basis of the position in which the shift/selection lever 1 occupies in the selection lane 5, the microcontroller 7 selects those actuators 8 which, when the shift/selection lever 1 is moved into one of the shift lanes 4, must be activated to engage the gear corresponding to this shift lane.

Figure 3:
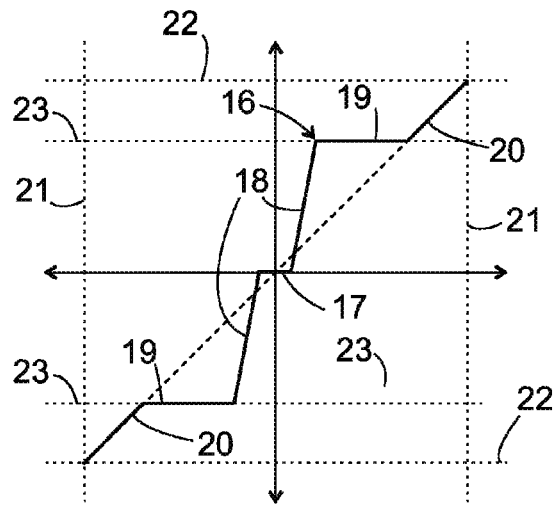
FIG. 3 shows the graphs of a function which describes the relationship between detected shift lever position and setpoint position of the actuator according to a first embodiment of the invention.

In the diagram of FIG. 3, the position of the shift/selection lever in one of the shift lanes 4 is plotted on the abscissa and an actuator setpoint position, which is established by the microcontroller 7 in each case corresponding to the detected lever position, is plotted on the ordinate. The particular observed actuator 8 may be the same in the left and right halves of the diagram of FIG. 3, if the clutch sleeve 10 controlled via it is displaceable from its neutral position in opposing directions and may be engaged in each case with one gear wheel. The two halves of the diagram may also relate to different actuators, however, one of which is activated at a time, depending on which of two branches of a shift lane 4 extending on both sides of the selection lane 5 the shift/selection lever 1 is moved into.

Dotted vertical lines 21 in the diagram each identify the boundaries of the movement freedom of the shift/selection lever 1, and horizontal dotted lines 22 indicate the boundaries of the movement freedom of the actuator(s) 8. These boundaries 21, 22 each correspond to shift positions of the shift/selection lever 1 and/or the actuator 8. Horizontal lines 23 each identify synchronization positions, i.e., positions of the actuator 8, in which it brings a clutch sleeve into contact with a synchronization ring in a locking synchronization assembly of the transmission and beyond which the actuator 8 may not advance because of the blocking action of the locking synchronization assembly, as long as clutch sleeve and synchronization ring are not synchronized.

A diagonal dashed line identifies the proportional relationship between the positions of the shift/selection lever 1 and a selector fork controlled via it in the case of a typical purely mechanical external shifter. The relationship between the positions of the shift/selection lever 1 and the actuator 8 implemented by the microcontroller 7 deviates in multiple points from this proportional ratio. The characteristic curve 16 shown thus firstly has a horizontal section 17, starting from the origin of the coordinate system, in which the actuator 8 does not follow a movement of the shift/selection lever 1. Small deflections of the shift/selection lever 1, which may occur, for example, during the movement of the lever 1 along the selection lane 5, but do not permit the intention of the driver to engage a specific gear to be concluded, thus do not result in the actuation of an actuator. Unnecessary actuator activations and rapid direction changes of the activation are thus avoided, which would only consume energy uselessly.

A section 18 of steeper slope adjoins the horizontal section 17. The boundary between the sections 17, 18 is placed in such a way that it is first exceeded when the shift/selection lever 1 has definitively left the selection lane 5 and entered a branch of a shift lane 4. When this has occurred, the actuator 7 moves the selector fork 9 very rapidly in relation to the selection lever movement 1 to bring the clutch sleeve 10 in a short time into a synchronization position corresponding to the line 23.

The synchronization of the locking synchronization assembly may thus begin at an earlier moment for the same velocity of the lever movement than with a mechanical external shifter and is therefore also already completed in a shorter time after the advance of the shift/selection lever 1 into the shift lane 4. The execution of the synchronization procedure is independent of possible irregularities of the lever movement in section 19.

The horizontal section 19 of the characteristic curve of FIG. 3 adjoining the section 18 is slightly beyond the synchronization position 23. i.e., the setpoint position of actuator 8 predefined in the section 19 is not reachable before completion of the synchronization. The discrepancy between actual and setpoint positions of the actuator 8 thus lasting during the entire synchronization procedure has the result that the actuator exerts a force in the direction of the shift position on the clutch sleeve 10.

The characteristic curve only has a proportional course in section 20 when the shift/selection lever 1 has passed the section 19 and it is probable because of the time span elapsed during the lever movement that the synchronization has been produced. This section corresponds to the engagement movement of the clutch sleeve 10 into selector teeth of the gear wheel, which has been synchronized in the meantime.

It is to be noted that the characteristic curve of FIG. 3 describes a setpoint position of the actuator 8 and/or the selector fork 9 driven thereby which is not necessarily coincident with the actual position. When the shift/selection lever is moved, the actual position of the selector fork 9 will rather always slightly lag behind the setpoint position, because the microcontroller 7 activates the actuator 8 to remedy the discrepancy only upon the occurrence of a discrepancy between actual and setpoint positions. The actuator 8 in turn exerts a positioning force on the selector fork 9. Depending on the type of the control by the microcontroller 7, this positioning force may be constant and, independently of the extent of the deviation between setpoint and actual positions of actuator 8, proportional to the deviation or to its time integral, for example. In both of the latter cases, a rapid movement of the shift/selection lever 1 results in a higher force on the clutch sleeve 10 and thus a more rapid synchronization. The driver thus has the possibility of shifting very rapidly if needed.

An actuator (not shown in FIG. 1) which is controlled by the microcontroller 7 may be provided on the shift/selection lever 1, which blocks the movement of the shift/selection lever 1 from the section 19 into the section 20, as long as the synchronization is not yet completed. The driver thus receives feedback about the incomplete synchronization procedure upon very rapid shifting, which is advisable above all if the clutch 12 is subject to manual control by the driver. If the clutch 12 is controlled by the microcontroller 7, such an actuator is not absolutely necessary; the movement of the shift lever 1 into the section 20 may also be released when the synchronization is not completed, because the microcontroller 7 is capable of recognizing this situation on the basis of the position of the actuator 8 and taking it into consideration upon control of the clutch 12.

Figure 4:
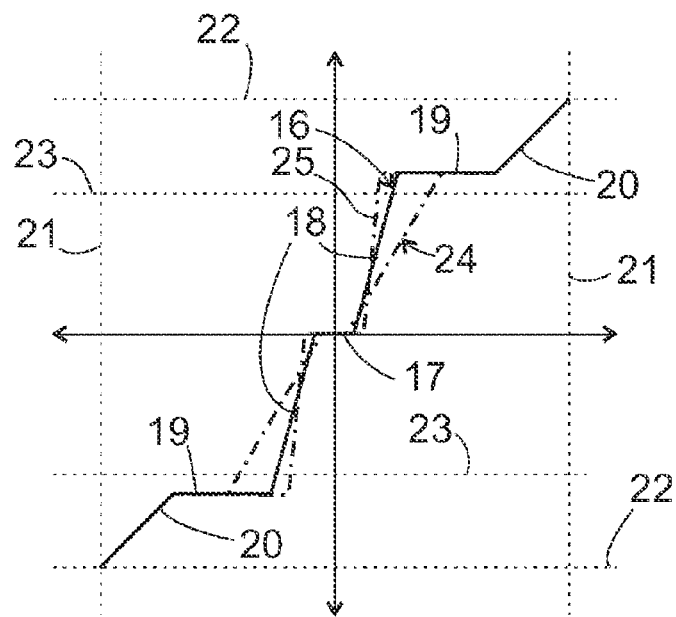
FIG. 4 shows a bundle of graphs which describe the relationship between detected shift lever position and setpoint position of the actuator according to a second embodiment of the invention.

FIG. 4 shows a bundle of graphs in a shared diagram, which describe the relationship between the position of the shift lever 1 detected by the sensor 6 and the assigned setpoint position of actuator 8 according to a second embodiment of the invention. The curve 16 of this diagram is similar to the curve 16 of FIG. 3, however, in contrast to the embodiment described with reference to FIG. 3, according to the embodiment of FIG. 4, the slope of the curve 16 is not a fixed constant in its section 18, but rather the microcontroller 7 measures its velocity while the shift/selection lever 1 moves in the section 17 close to the origin of the diagram. The slower the shift/selection lever 1 is moved, the shorter the path distance required for a velocity measurement and the shorter is the section 17 established for the relevant shift procedure. Furthermore, the slope of the section 18 is established as smaller the lower the velocity of the shift/selection lever, as shown in the figure on the basis of the dot-dash curve 24. In the extreme case, during a very slow movement of the shift/selection lever 1, the sections 17, 19 may be established having practically vanishing length, and the setpoint value of the actuator position established by the microcontroller 7 corresponds to a proportional control, as also shown by the dashed diagonal in FIG. 3.

Of course, during an extremely rapid movement of the shift/selection lever 1, an opposing change is also possible, as illustrated by the curve 25: corresponding to a longer path distance required for the velocity measurement, the section 17 is lengthened in comparison to the curve 16, the slope in section 18 is increased, and the section 19 is also lengthened.

This variability of slope and section lengths has the result that during a rapid shift movement, the time span which elapses during displacement of the actuator 8 from the neutral position into the synchronization position does not decrease inversely proportional to the velocity as with a mechanically shifted transmission, but rather significantly more strongly. Simultaneously, the proportion of the synchronization procedure in the total duration of the shift procedure grows. The intention of the driver to shift rapidly is also recognized and supported by the microcontroller 7.

Figure 5:
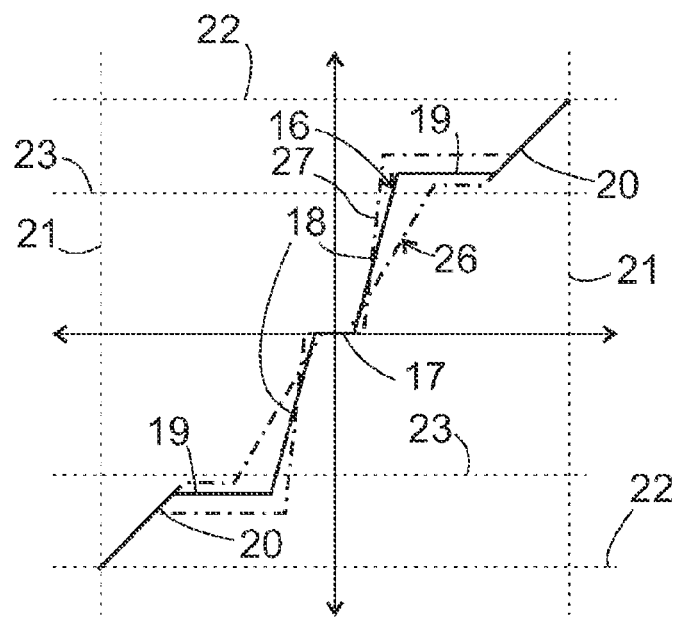
FIG. 5 shows a bundle of graphs which describe the relationship between detected shift lever position and setpoint position of the actuator according to a third embodiment of the invention.

The diagram shown in FIG. 5 differs from that of FIG. 4 in that the setpoint position of the actuator in the section 19 is also established by the microcontroller 7 in every individual shift procedure as a function of the measured velocity of the shift/selection lever 1. During a slow shift procedure, corresponding to the curve 26, the difference between the setpoint position and the synchronization position of actuator 8 is less than for the moderate velocity of the curve 16, so that the contact pressure force exerted by the actuator 8 on the clutch sleeve 10 is also lower. The shift procedure is thus executed more slowly and quietly. Vice versa, upon a higher velocity of the shift/selection lever, corresponding to the curve 27, the difference between setpoint position and synchronization position is increased, so that the actuator 8 presses on the clutch sleeve 10 with higher force and thus shortens the time required for the synchronization. This allows extremely rapid shifting if needed.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A shift-by-wire control unit, comprising:
a shift lever that is movable on a path between a neutral position and at least one shift position;
a sensor for detecting a position of a shift lever;
a control circuit; and
an actuator for driving a selector fork in accordance with a movement of the shift lever that is detected by the control circuit,
wherein the control circuit is adapted to predefine a setpoint position of the actuator for a detected position of the shift lever, the rate of change of the setpoint position as a function of the shift lever position being higher in a first area of a path adjacent to the neutral position than in a second area of the path that is at a greater distance from the neutral position than the first area.

2. The shift-by-wire control unit according to claim 1, wherein the rate of change is constant and positive in the first area of the path.

3. The shift-by-wire control unit according to claim 1, wherein the shift-by-wire control unit is adapted to select the rate of change as higher in the first area the greater a measured velocity of the movement of the shift lever.

4. The shift-by-wire control unit according to claim 1, wherein the setpoint position in the second area lies between a synchronization position and a shift position of the actuator.

5. The shift-by-wire control unit according to claim 1, wherein the shift-by-wire control unit is adapted to select a distance between the setpoint position in the second area and the synchronization position of the selector fork as greater the greater a measured velocity of the movement of the shift lever.

6. The shift-by-wire control unit according to claim 1, wherein the rate of change is zero in the second area.

7. The shift-by-wire control unit according to claim 1, wherein the path comprises a third area that is closer to the shift position than the first area and the second area, and the rate of change is positive in the third area.

8. The shift-by-wire control unit according to claim 7, wherein the rate of change of the third area is between the rate of change in the first area and that in the second area.

9. The shift-by-wire control unit according to claim 7, wherein the third area contains the shift position.

10. The shift-by-wire control unit according to claim 7, wherein the neutral position is contained in a fourth area of the path, in which the rate of change is lower than in the first area.

11. The shift-by-wire control unit according to claim 7, wherein the shift-by-wire control unit is adapted to measure the velocity of the shift lever in the fourth area.

12. The shift-by-wire control unit according to claim 1, wherein the rate of change is zero at the neutral position.

13. A method for controlling a shift procedure in a stepped transmission, comprising the steps of:
detecting a position of a shift lever that is movable on a path between a neutral position and at least one shift position; and
establishing a setpoint position of an actuator on the basis of a function that specifies the setpoint position as a function of the position of the shift lever position; and
activating the actuator to implement the setpoint position,
wherein the rate of change of the function using the shift lever position is higher in a first area of the path, adjacent to the neutral position, than in a second area of the path, which is at a greater distance from the neutral position than the first area.

14. A computer readable medium embodying a computer program product, said program product comprising:
a program for controlling a shift procedure in a stepped transmission program, the program configured to:
detect a position of a shift lever that is movable on a path between a neutral position and at least one shift position; and
establish a setpoint position of an actuator on the basis of a function that specifies the setpoint position as a function of the position of the shift lever position; and
activate the actuator to implement the setpoint position,
wherein the rate of change of the function using the shift lever position is higher in a first area of the path, adjacent to the neutral position, than in a second area of the path, which is at a greater distance from the neutral position than the first area.

* * * * *